Nov. 24, 1942.　　E. A. FREDRICKSON　　2,303,037
VALVE
Filed Feb. 27, 1941　　3 Sheets-Sheet 1
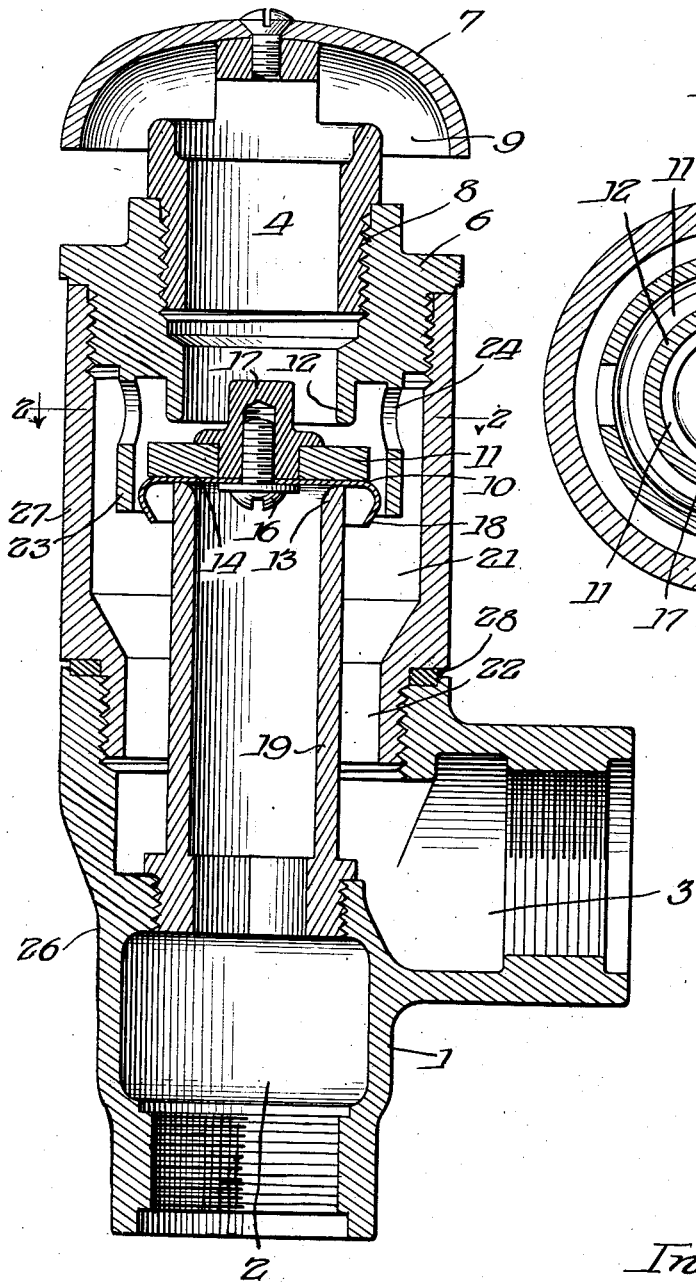
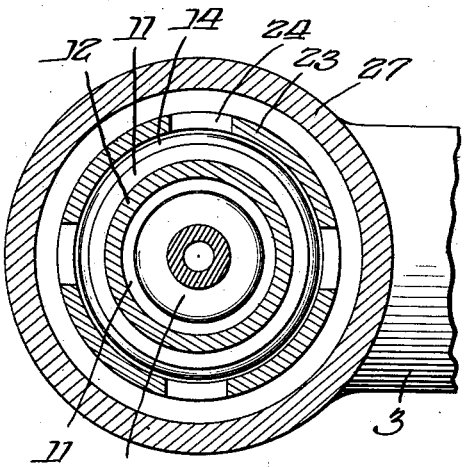
Inventor:
Edward A. Fredrickson
By Joseph O. Lange, Atty.

Nov. 24, 1942.  E. A. FREDRICKSON  2,303,037
VALVE
Filed Feb. 27, 1941   3 Sheets-Sheet 2

Inventor:
Edward A. Fredrickson
By: Joseph O. Lange Atty

Nov. 24, 1942.   E. A. FREDRICKSON   2,303,037
VALVE
Filed Feb. 27, 1941   3 Sheets-Sheet 3

Inventor:
Edward A. Fredrickson
By Joseph O. Lange Atty.

Patented Nov. 24, 1942

2,303,037

UNITED STATES PATENT OFFICE 2,303,037

VALVE

Edward A. Fredrickson, Chicago, Ill., assignor to Crane Co., Chicago, Ill., a corporation of Illinois Application February 27, 1941, Serial No. 380,785

5 Claims. (Cl. 137—69)

Vacuum breaker valves are preferably installed on the downstream side of flow control valves in plumbing fluid lines where they permit the flow of fluid from the supply lines into a plumbing fixture, such as a lavatory, sink, bathtub or the like, but prevent the back-flow or back-siphonage of water from the fixture into the clean main water supply lines. Water so back-siphoned is very likely to be soiled and the resulting contamination of the main supply line may spread disease throughout a whole community before the cause is located. This back-siphonage may be caused by a vacuum produced in the supply pipe line of any given plumbing fixture by shutting off the water main or the water supply in the building for repairs, or it may similarly be caused by the opening of a faucet or flush valve at a point below the plumbing fixture, as for instance, on the floor below.

I have discovered that under such circumstances water may be drawn from a lavatory, sink or bathtub even when there is an air space as great as 2" between the outlet of the plumbing supply fixture and the water level. Back-siphonage conditions are especially ideal in cases where a flexible hose having a shampoo spray head connected to it is attached to the faucet of a bathtub or lavatory and this spray head is allowed to rest below the surface of the water in the fixture at a time when the faucet is still open. Thus when a siphon is subsequently created the water may be drawn back through the spray head and into the fresh water supply line.

The invention herein described represents an improvement over my vacuum breaker valve covered by United States Letters Patent No. 2,028,101, granted January 14, 1936, and is the result of later developments in that construction. It was found that my prior construction allowed water to leak past the air vents on low initial rates of flow. Commercially, this did not keep the valve from being a success since low initial flow rates are seldom encountered in normal service for it is usually the practice in opening a flow control valve to open quite substantially at first and then later to throttle down to the desired lower flow rate. With such operation as described my vacuum breaker valve would not leak at all.

It is my object herein to provide, first, a vacuum breaker valve which is simple, compact and relatively economical to manufacture, and secondly, it is my object to provide a modification of this construction which will be absolutely leak-proof on any pressure or flow rate without limitation.

Another object of my present invention lies in the provision of a tiltable type of vacuum breaker disc or closure member which is operative by the movement of fluid through the valve and which has a peripheral lower depending, inwardly extending skirt, in order to increase its sensitivity to the movement of the line fluid.

Still another object is to provide a vacuum breaker valve with a tiltable closure member which provides a one-way seal on the end portion of a substantially tubular seat member leading from the inlet of the valve.

A further broad object is the provision of a simple economical vacuum breaker valve which is extremely sensitive to low rates of flow.

Another advantage of my construction lies in the provision of a vacuum breaker valve which is fluid-tight at substantially all domestic water pressures and rates of flow by incorporating a floating air vent valve into the device.

Further objects and advantages will become more readily apparent to those who are skilled in the art upon examination of the following description in connection with the accompanying drawings, in which Fig. 1 is a sectional assembly view of one form of a vacuum breaker valve embodying my invention.

Fig. 2 is a fragmentary sectional view taken on the line 2—2 of Fig. 1.

Similar reference characters refer to similar parts throughout the various views.

Figure 3:
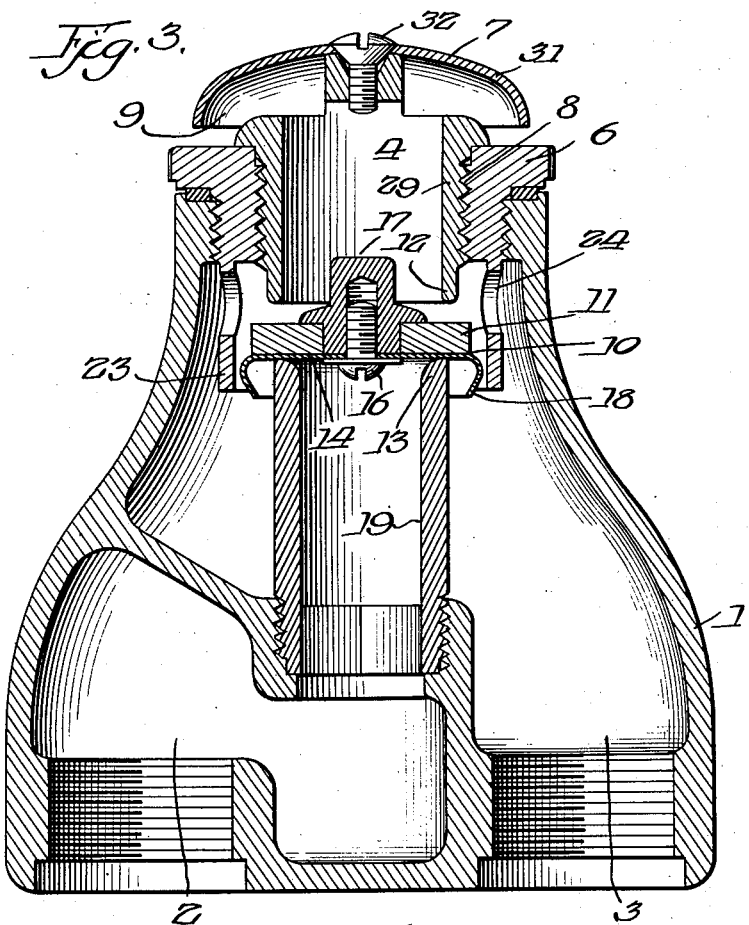
Fig. 3 is a sectional assembly view of a modified form of my device.
Figure 4:
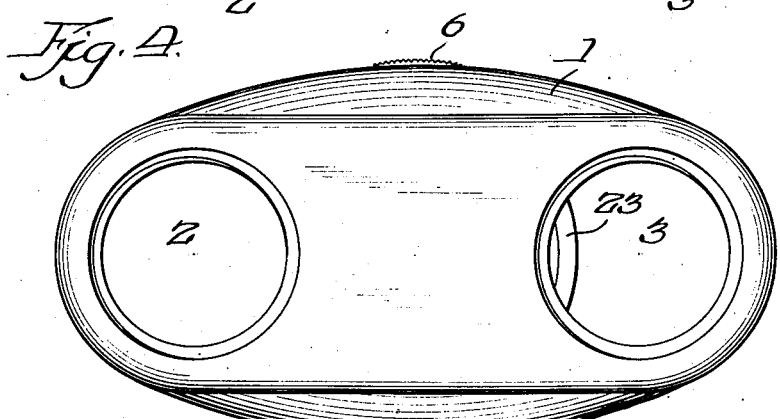
Fig. 4 is an outside view of the construction of Fig. 3, looking into adjoining port openings.

Referring to Fig. 1, a preferred embodiment consists of a body or casing generally designated 1, having the usual water inlet 2, a side outlet 3 and a vent passage 4 leading to atmosphere through the vent bushing 6. The location of the outlet 3 is not significant and may be located other than in the positions shown in the several views. The vent cap 7 is preferably attached to the bushing 6 by means of threads 8. Obviously the vent cap 7 may be attached in any other suitable manner or may even be integral with the bushing 6, if desired. The vent cap 7 is preferably furnished with a number of ports or the annular passage 9 to admit the air into the casing from the surrounding atmosphere in the event of the formation of a vacuum within the line upon which the valve is installed as hereinbefore generally referred to. More particularly, when a vacuum does occur within the supply line leading into the inlet 2, the valve closure member generally designated 10, which line pressure normally seats against the annular surface 12, drops to the upper rimmed seating surface 13 of the stand tube 19. Within the space immediately above the latter tubular member, air enters the vent passage 4 through the cap 7 and then passes into the side outlet 3 to a plumbing fixture or the like (not shown).

Immediately upon the water pressure being restored within the inlet 2 and within the stand tube 19 the closure member 10 again rises under the influence of such pressure to make a tight bearing against the aforementioned seating surface 12. The closure member 10 which includes the disc 11 generally of a composition, although not necessarily required, is mounted upon a relatively thin circular plate 14 by means of the screw bolt 16 and the flanged nut 17. The plate 14 is preferably provided with a lower depending peripheral skirt 18 which serves to deflect the water downwardly as it rises upwardly from the stand tube 19, thereby achieving substantially maximum lift from the flowing water. It will thus become apparent that the reaction forces are utilized which result from approximately a 180 degree reversal of flow. Thus the normal path of water flow is into the inlet 2, upwardly through the stand tube 19, then downwardly past the annular chambers 21 and 22 to the discharge outlet 3 for entry into such fixture as may be employed therewith. The stand tube 19 is provided in lieu of the conventional short seat, in order to accomplish more smooth and uniform flow of water in directing it against the underside of the valve holder 14. Further, such elongated tube portion serves the additional function of permitting the disc 11 to be maintained more positively against its seat 12. Further provision is made for the circumferential clearance between the valve holder 14 and the guide sleeve 23 to be sufficient to allow the closure member to tilt and move freely between the respective upper and lower seats 12 and 13 under the influence of relatively slight differential pressures. The guide sleeve 23 surrounds the skirted disc holder 14, allowing water to overflow from the stand tube at a location beneath the disc holder in a uniform manner thereby creating uniform reaction forces against the bottom circumferential portion of the disc holder and thus promoting the positive fluid-sealing abutment of the disc 11 with its seat 12 to a greater degree. The guide sleeve 23 is preferably constructed with the air vent apertures 24 arranged so as to provide ready and substantially direct communication between the air vent passage 4 with the outlet 3 through the annular passages 21 and 22.

While the angle type valve is preferably illustrated, it should be apparent that many other modifications will perform with equally satisfactory results. Thus, for example, while the body or casing 1 is shown as being made in two parts 26 and 27 threadedly connected together and sealed by means of the gasket member 28, these parts may obviously be constructed integrally. Likewise, while the stand tube 19 is shown as screwed into the body, this member may obviously be attached in any other suitable manner or it may also be cast integrally. A separate stand tube however appears to be more desirable from the standpoints of ease of machining and replacement. The cap 7 and the bushing 6 may also be cast in one piece, if desired.

In explanation of its novel functioning, the general construction embodying my invention permits the valve closure member to build up back pressure sufficiently to render it extremely sensitive even on relatively low pressure differentials. The latter element is a very important consideration in contributing to the successful operation of the valve and rendering it sensitive to the lowest practical rates of flow.

The disc assembly may be made as shown, but of course, if desired, the entire disc assembly may be made integral and thus dispense with the renewability of the upper portion. An absolutely tight seal between the disc holder (or bottom of an integral disc) and the stand tube is not a prerequisite to the successful operation of my valve. However, for absolute safety in avoiding back siphonage the valve must be installed properly, namely, at the highest point in the line, thereby eliminating the possibility of gravity flow of fluid from the lavatory or other fixture into the vacuum breaker valve proper.

Fig. 3 shows another modification of my valve, similar in all general elements of construction and operation to Fig. 1, except that the casing is made in a single piece and is so formed as to allow the inlet and outlet pipes to be vertically parallel and in the same horizontal plane which is a convenience in installation inasmuch, as previously stated, the valve must be installed at the highest point in the line, and the cap generally designated 7 is made in two pieces, a separate threaded bushing 29 and a bell-shaped member 31 joined by means of the set-screw 32.

Figure 5:
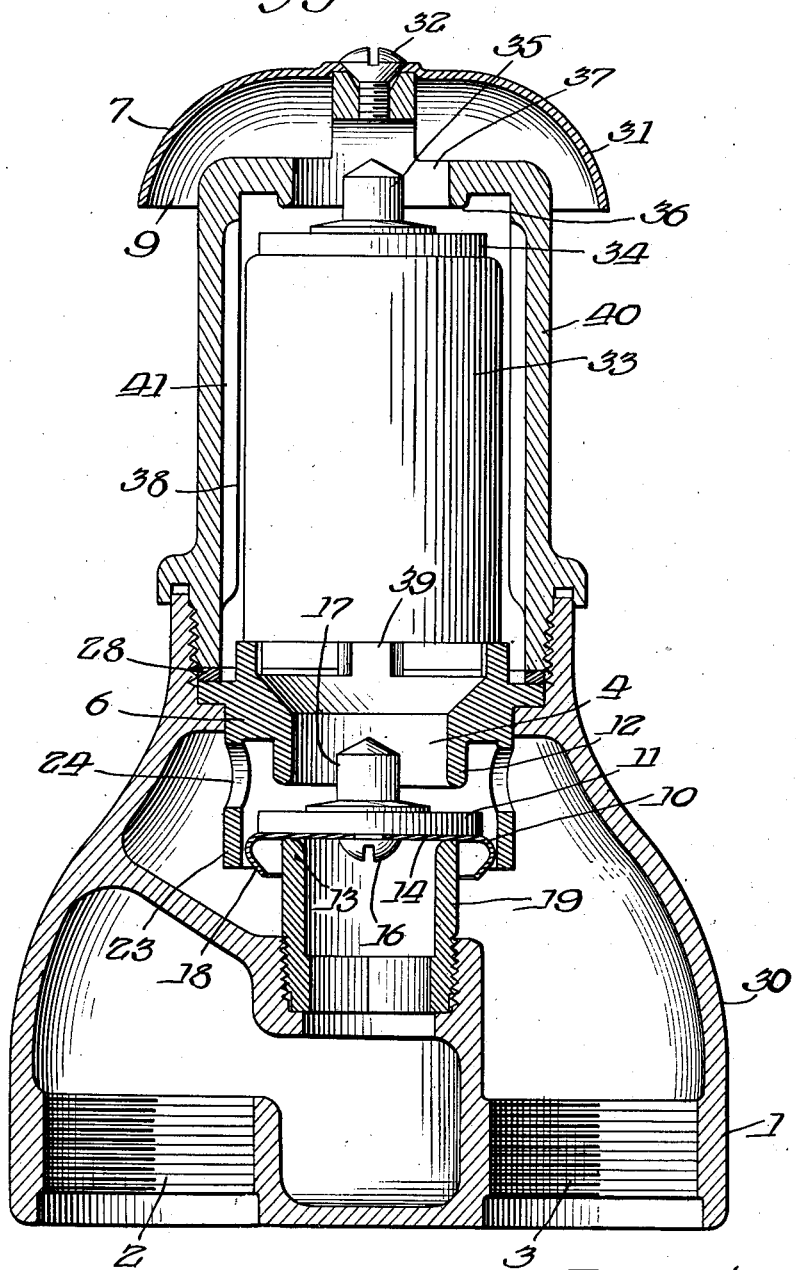
Fig. 5 is a modified form of Fig. 3 employing in addition a floatable holder for a separate air vent valve.

Fig. 5 shows a further modification of Fig. 3 made especially for service where the initial rates of flow are likely to be extremely low. It is constructed, as shown, with all the essential parts of Fig. 1 and Fig. 3 and in addition a hollow float member 33 in the shape of an inverted cup carries a separate disc 34 at its upper end portion. The latter member is fastened in the same manner as the disc 11, by means of a bolt (not shown) and the flanged nut 35. As indicated, the disc 34 is engageable with a seat 36 annularly formed around the inner portion of the air inlet 37. The casing is composed of the main lower portion 30 and the upper float housing 40 threadedly connected together and provided with the gasket 28, as shown. The additional float arrangement described in connection with this figure prevents line water within the casing from flowing out of the valve onto the floor at the very low rates of flow in which the latter are insufficient to cause the closure member 10 to rise and to seal the air vent 4.

In general, therefore, the operation of the valve shown in Fig. 5 is variable to suit conditions of very low rates of flow and those of high rates of flow. In illustration of the latter statement, if water of the pipe line is admitted into the inlet 2 at relatively high velocity, the closure member 10 will instantly rise into sealing contact with its seat 12, positioned as already described. Under this condition, little, if any, water will escape into the float chamber 38. The float 33 will remain at rest upon the upwardly extending spaced-apart lugs 39 of the bushing 6. Water will then be deflected downwardly over the outside of the stand tube 19 and into the outlet 3. Upon the subsequent creation of a vacuum within the inlet 2 for any reason, the disc 11 will close off the top 13 of the stand tube 19 and the water escaping through the outlet 3 by gravity to the lavatory or bathtub will draw in air through the inlet 37. The air thus admitted will pass downdardly over the float 33 into the space between the float guides 41, through the openings between the prongs 39, through the vent passage 4 and the apertures 24 of the bushing 6, thence to the outlet 3. So much for the description of operation pertaining to high velocity flow.

On the other hand, if water of the pipe line is admitted into the inlet 2 at an extremely low velocity, the closure member 10 will not rise sufficiently to seal the air vent 4 and if there is sufficient back pressure in the outlet 3, as is usually the case, the water being thus admitted will rise slowly through the air vent 4 and into the float chamber 38. Thereupon the float 33 will rise until the disc 34 abuts the seat 36. At this time the pressure will increase within the valve and force the disc 34 into leak-proof engagement with the seat 36 thus effectively preventing the escape of the relatively slowly rising water out into the atmosphere and onto the floor to create an objectionable and insanitary condition. But upon the subsequent creation of a vacuum within the inlet, as previously described, the disc 11 will then immediately drop from its engagement with the seat 12 and seal the stand tube inlet. The float valve 34 will then fall away from its seat as the water in the float chamber 38 escapes down through the vent 4 and the outlet 3 to the fixture with which it is connected. Air will then enter the casing from the surrounding atmosphere as has been already described.

Thus, in recapitulation, broadly, I have shown the construction of a vacuum breaker valve which is extremely simple to manufacture, positive in its operation, and which may optionally be made (1) absolutely leak-proof or (2) leak-proof for all velocities except extremely low and seldom practically encountered rates of flow, one or the other modification to be chosen depending upon the economics of a particular installation. For example, a private home owner would desire a vacuum breaker which would be absolutely leak-proof at all flow conditions and would be willing to pay extra for the added protection of the float valve modification described in connection with Fig. 5. In contradistinction, where purchases are made in relatively large volume and economy is a significant factor, consistent with first class performance, the valves of Fig. 1 or Fig. 3 would appear more desirable, since they can be manufactured even more cheaply than Fig. 5. The few drops of water that overflow through the air vent at infrequent intervals due to occasional very low initial water velocities will be inconsequential compared to the first cost on a large volume order.

It will be apparent that a variety of forms are available within the spirit of my invention, and I desire, therefore, to be limited only within the scope of the appended claims.

I claim:

1. In a pressure actuated valve of the character described, a casing having fluid inlet and outlet connections, an intermediate partition wall between said connections and having an opening therethrough, an elongated, tubular seat positioned within the said opening, a reciprocably movable closure member mounted tiltably thereon, the said closure member having a lower depending, inwardly extending skirt abutting upon and surrounding an upper annular portion of the said seat in the closed position of the valve whereby a huddling chamber is formed therebetween, the said casing having an opening to atmosphere, the outer periphery of the said lower depending skirt serving as a guide for the said closure member within the casing during the reciprocal movement of the latter member, the said closure member being engageable with said opening to atmosphere to form a fluid seal upon actuation by line pressure.

2. In a pressure actuated valve of the character described, a casing having fluid inlet and outlet connections, an intermediate partition wall between said connections and having an opening therethrough, an elongated cylindrical seat attached within said opening and on the outlet side thereof, sleeve guide means within the casing, a closure member mounted relatively loosely upon the said seat and annularly guided within the said guide means, the said guide means and the said cylindrical seat being in substantial axial alignment, said closure member having a peripheral skirt enclosing a substantial portion of the said seat, the outer periphery of the skirt being shaped so as to form an annular line bearing with the inner peripheral surface of the said guide means for annularly guiding the said closure member, said guide means having a passage in substantial axial alignment with a vent to atmosphere, the said closure member being engageable with said vent upon actuation by line pressure to form a shut-off therefor.

3. A valve of the class described comprising a casing having an inlet and an outlet, an intermediate partition wall between the said inlet and the said outlet and having an opening therethrough provided with a substantially raised tubular seat, the said casing having a vent to atmosphere, a valve closure member mounted relatively loosely having oppositely disposed faces and interposed between the said cylindrical seat and the said vent, the periphery of the said closure member being provided with a depending skirt portion extending inwardly at its lower end and forming the contact portion of the said closure member with the said seat and substantially surrounding the upper portion of the said cylindrical seat to form a huddling chamber whereby the force of line pressure is directed through said seat against the bottom and sides of the said skirt portion.

4. A valve of the class described comprising a casing having an inlet and an outlet, an intermediate partition wall between the said inlet and the said outlet and having an opening therethrough fitted with a substantially raised cylindrical seat, the said casing having an air vent in substantial axial alignment with the said cylindrical seat, a double-seated peripherally-guided tiltable valve closure member interposed between the upper face of the said cylindrical seat and the said air vent, the said closure member cooperating with the said seat and the said vent respectively to provide an independent fluid seal for each, the said closure member at its lower peripheral portion being provided with a renewable substantially axial downwardly extending, rimmed extension serving jointly to guide the said closure member peripherally and to intermittently interrupt and to reverse the flow in its passage past the said cylindrical seat, the said rimmed extension substantially enclosing only a small upper portion of the said seat.

5. A pressure actuated valve comprising a casing having an inlet and an outlet, an intermediate partition wall between the said inlet and the said outlet and having an opening therethrough provided with an elongated tubular seat, the said casing having a vent to atmosphere, a valve closure member mounted relatively loosely having oppositely disposed faces and interposed between the said elongated seat and the said vent, the periphery of the said closure member being provided with a depending skirt portion, said depending skirt portion extending downwardly for relatively a small fraction of the height of the said elongated seat, whereby fluid flowing through the valve and reversed in its flow by the depending skirt portion is directed annularly to the outer peripheral surface portion of the said elongated seat to thereby minimize flow turbulence adjacent to the contact surface portion of the said seat.

EDWARD A. FREDRICKSON.